US008087236B2

(12) United States Patent
Ueda et al.

(10) Patent No.: US 8,087,236 B2
(45) Date of Patent: Jan. 3, 2012

(54) EXHAUST GAS PURIFYING APPARATUS FOR AN INTERNAL COMBUSTION ENGINE AND A METHOD FOR CONTROLLING SAME APPARATUS

(75) Inventors: Takanori Ueda, Susono (JP); Tomihisa Oda, Numazu (JP); Kuniaki Niimi, Susono (JP); Kenichi Tsujimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 930 days.

(21) Appl. No.: 11/992,756

(22) PCT Filed: Oct. 16, 2006

(86) PCT No.: PCT/IB2006/002877
§ 371 (c)(1),
(2), (4) Date: Mar. 28, 2008

(87) PCT Pub. No.: WO2007/045988
PCT Pub. Date: Apr. 26, 2007

(65) Prior Publication Data
US 2009/0007546 A1 Jan. 8, 2009

(30) Foreign Application Priority Data

Oct. 17, 2005 (JP) .................................. 2005-301682

(51) Int. Cl.
*F01N 3/00* (2006.01)
(52) U.S. Cl. ................. 60/286; 60/288; 60/289; 60/297
(58) Field of Classification Search ...................... 60/286
See application file for complete search history.

(56) References Cited

U.S. PATENT DOCUMENTS 6,502,391 B1 * 1/2003 Hirota et al. ..................... 60/288
(Continued)

FOREIGN PATENT DOCUMENTS

DE 196 26 837 A1 1/1997
(Continued)

OTHER PUBLICATIONS

Itabashi et al., "Study of Improvements in NOx Reduction Performance on Simultaneous Reduction System of PM and NOx," 2005, SAE International, 2005-01-3884, p. 1795-1803.

*Primary Examiner* — Thomas Denion
*Assistant Examiner* — Jason Shanske
(74) *Attorney, Agent, or Firm* — Oliff & Berridge, PLC

(57) ABSTRACT

An exhaust gas purifying system for an internal combustion engine includes a first exhaust passage (22*a*) and a second exhaust passage (22*b*) into which an exhaust passage (21) of the internal combustion engine is bifurcated. NOx storage reduction catalysts (23*a*, 23*b*) and particulate filters (24*a*, 24*b*) are provided in each of the exhaust passages (22*a*, 22*b*). Fuel is supplied from a fuel valve (32) when NOx is to be released from the NOx storage reduction catalysts (23*a*, 23*b*). At a timing when the supplied fuel attaches to the NOx storage reduction catalysts (23*a*, 23*b*), one of exhaust control valves, for example, a first exhaust control valve (26*a*) is temporarily closed so as to keep the air-fuel ratio of exhaust gas rich. When NOx is released from the NOx storage reduction catalysts (23*a*, 23*b*) next time, a second exhaust control valve (26*b*) is temporarily closed after the fuel is supplied.

25 Claims, 14 Drawing Sheets

U.S. PATENT DOCUMENTS

| | | | |
|---|---|---|---|
| 7,908,844 B2 * | 3/2011 | Kamoshita et al. | 60/286 |
| 2001/0011455 A1 * | 8/2001 | Harima et al. | 60/288 |
| 2003/0061802 A1 * | 4/2003 | Nakatani et al. | 60/284 |
| 2003/0192306 A1 * | 10/2003 | Nakatani et al. | 60/288 |
| 2003/0213235 A1 * | 11/2003 | Kitahara et al. | 60/295 |
| 2004/0006977 A1 * | 1/2004 | Nakatani et al. | 60/288 |
| 2005/0109028 A1 * | 5/2005 | Shirakawa et al. | 60/602 |

FOREIGN PATENT DOCUMENTS

| | | |
|---|---|---|
| DE | 101 20 592 A1 | 10/2001 |
| JP | A-07-102947 | 4/1995 |
| JP | A-2003-074328 | 3/2003 |

* cited by examiner

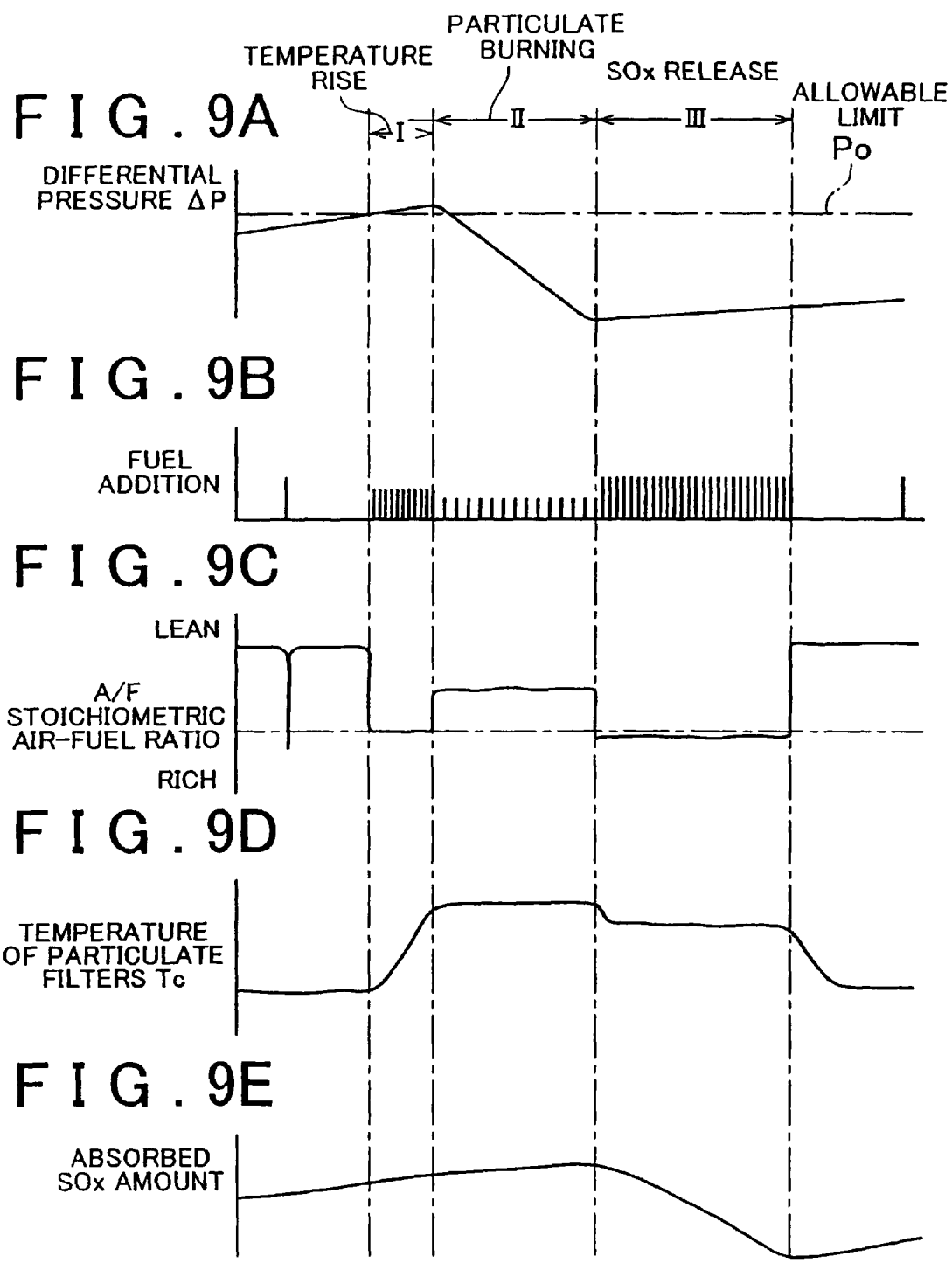

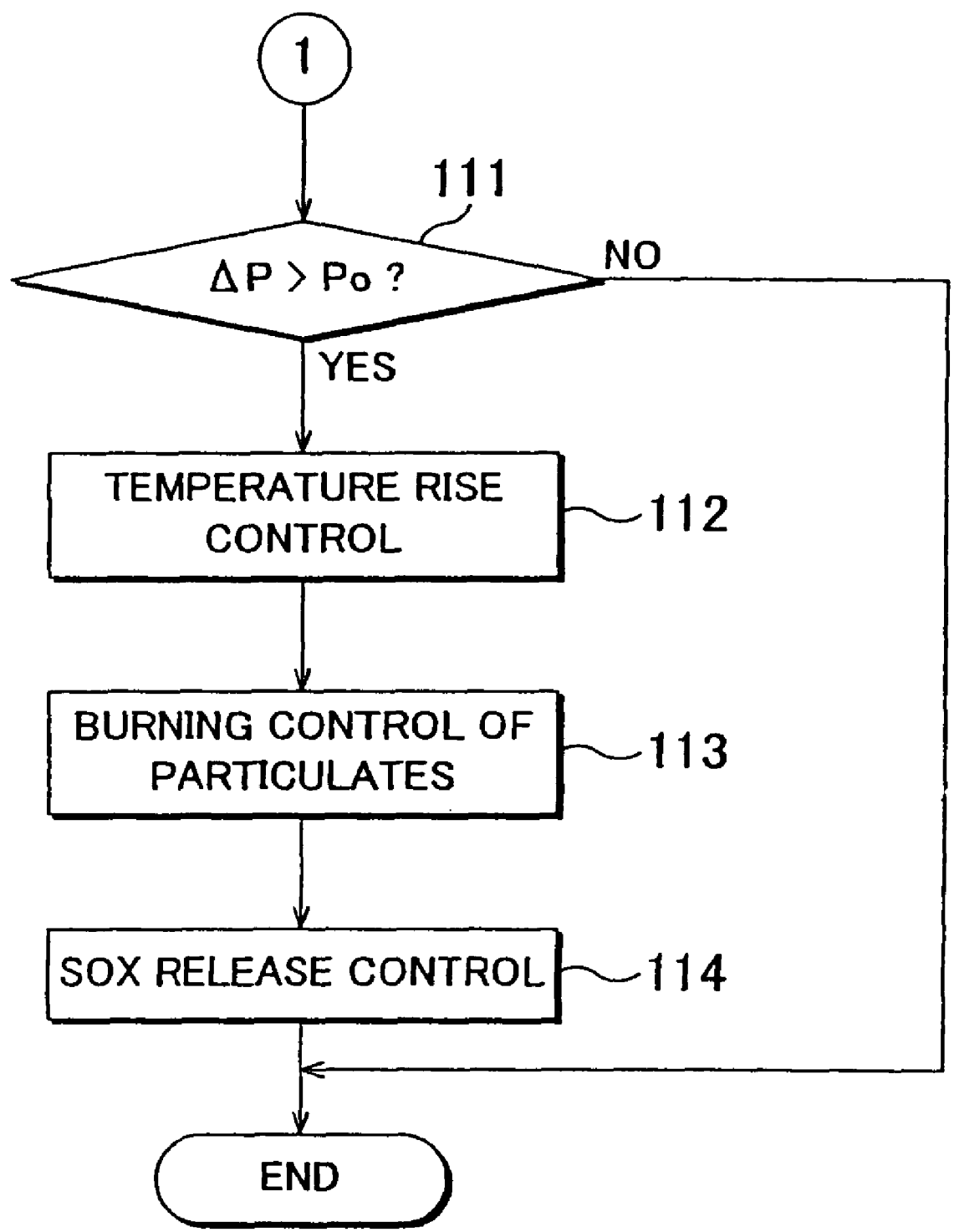

EXHAUST GAS PURIFYING APPARATUS FOR AN INTERNAL COMBUSTION ENGINE AND A METHOD FOR CONTROLLING SAME APPARATUS

BACKGROUND OF THE INVENTION

1. Field of the Invention

The invention relates to an exhaust gas purifying apparatus for an internal combustion engine and a method for controlling the same apparatus.

2. Description of the Related Art

A known internal combustion engine includes a first exhaust passage and a second exhaust passage into which a common exhaust passage is bifurcated, NOx absorbent being provided in each of the first exhaust passage and the second exhaust passage, and the NOx absorbent storing NOx contained in exhaust gas when the air-fuel ratio of incoming exhaust gas is lean and releasing NOx stored therein when the air-fuel ratio of incoming exhaust gas is rich. In this internal combustion engine, in each of the first exhaust passage and the second exhaust passage, a fuel valve is provided upstream of the NOx absorbent and an exhaust control valve is provided downstream of the NOx absorbent (For example, see Japanese Patent Application Publication No. JP-A-7-102947).

In the internal combustion engine described above, when releasing NOx stored in the NOx absorbent in the first exhaust passage, the air-fuel ratio of exhaust gas in the first exhaust passage is made rich by closing the exhaust control valve in the first exhaust passage so as for the exhaust gas in the first exhaust passage to remain therein and then supplying fuel from the fuel valve in the first exhaust passage. Likewise, when releasing NOx stored in the NOx absorbent in the second exhaust passage, the air-fuel ratio of exhaust gas in the second exhaust passage is made rich by closing the exhaust control valve in the second exhaust passage so as for the exhaust gas in the second exhaust passage to remain therein and then supplying fuel from the fuel valve in the second exhaust passage.

However, in the above internal combustion engine, there is a problem that two fuel valves are necessary for releasing NOx from the NOx absorbent. More importantly, since the fuel valves are arranged quite far from the engine, a fuel supply pipe needs to be extended thereto, which is another problem.

SUMMARY OF THE INVENTION

A first aspect of the invention relates to an exhaust gas purifying apparatus for an internal combustion engine including a first exhaust passage and a second exhaust passage into which a common exhaust passage provided upstream of the first and second passages is bifurcated, wherein a NOx absorbent is provided in each of the first exhaust passage and the second exhaust passage, the NOx absorbent storing NOx contained in exhaust gas when an air-fuel ratio of incoming exhaust gas becomes lean and releasing the NOx when the air-fuel ratio of incoming exhaust gas becomes rich. In this apparatus, a fuel valve is provided in the common exhaust passage, and fuel is supplied from the fuel valve when it is necessary to release NOx from the NOx absorbent provided in the first exhaust passage and from the NOx absorbent provided in the second exhaust passage, so as to make an air-fuel ratio of exhaust gas in each of the first exhaust passage and the second exhaust passages rich, and one of the first exhaust passage and the second exhaust passage is temporarily closed after the fuel is supplied from the fuel valve so as for the air-fuel ratio of exhaust gas in the one of the first exhaust passage and the second exhaust passage to remain rich.

A second aspect of the invention relates to a method for controlling an exhaust gas purifying apparatus for an internal combustion engine including a first exhaust passage and a second exhaust passage into which a common exhaust passage provided upstream of the first exhaust passage and the second exhaust passage is bifurcated into, a NOx absorbent being provided in each of the first exhaust passage and the second exhaust passage, the NOx absorbent storing NOx contained in exhaust gas when an air-fuel ratio of incoming exhaust gas is lean and releasing the NOx when the air-fuel ratio of incoming exhaust gas is rich, and the fuel valve being provided in the common exhaust passage. In this method, fuel is supplied from the fuel valve when it is necessary to release NOx from the NOx absorbent provided in the first exhaust passage and the NOx absorbent provided in the second exhaust passage, so as to make the air-fuel ratio of exhaust gas in each of the first exhaust passage and the second exhaust passage rich; and one of the first exhaust passage and the second exhaust passage is temporarily closed after the fuel is supplied from the fuel valve so as for the air-fuel ratio of exhaust gas in the one of the first exhaust passage and the second exhaust passage to remain rich.

According to these aspects of the invention, the number of fuel valves can be reduced while ensuring a good fuel consumption, and the fuel valve can be provided closer to the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 9A to 9E are time charts illustrating the differential pressure $\Delta P$ of the particulate filters, the timing for fuel addition, the air-fuel ratio in the exhaust passages, the temperature of the particulate filters, and the absorbed SOx amount in the NOx absorbent;

FIGS. 13A and 13B are flowcharts of the exhaust gas purifying process; and

DETAILED DESCRIPTION OF THE PREFERRED EMBODIMENTS

Figure 1:
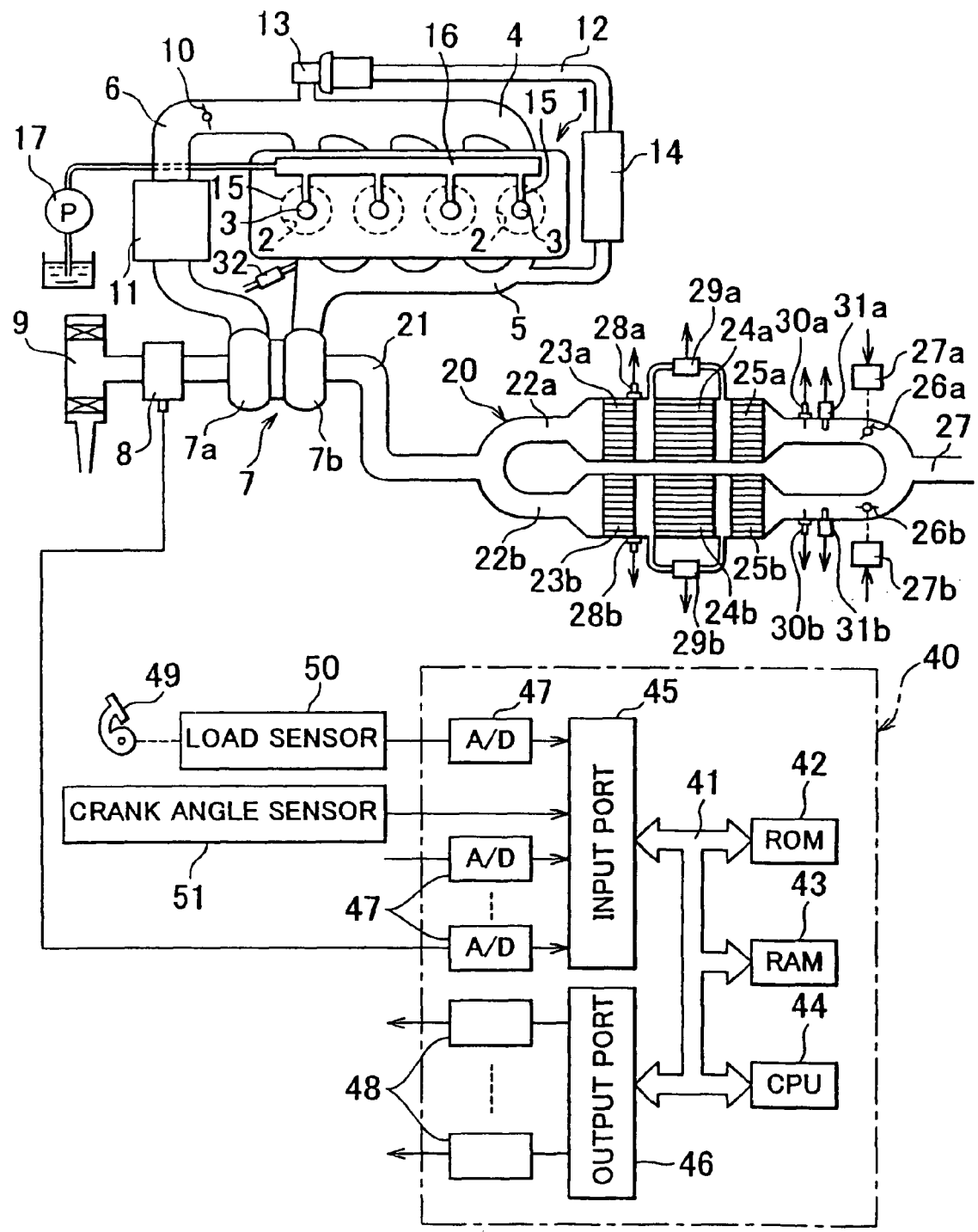
FIG. 1 is an overall view of a compression ignition type internal combustion engine.

FIG. 1 is an overall view of a compression ignition type internal combustion engine. FIG. 1 shows an engine body 1, combustion chambers 2 of the cylinders, electronic fuel injection valves 3 for injecting fuel into the respective combustion chambers 2, an intake manifold 4, and an exhaust manifold 5. The intake manifold 4 is connected to the outlet of a compressor 7a of an exhaust-gas-driven turbo charger 7 via an intake duct 6, and the inlet of the compressor 7a is connected to an air cleaner 9 via an air flow meter 8. An electronic throttle valve 10 is provided in the intake duct 6, and a cooling device 11 for cooling intake air flowing through the intake duct 6 is provided so as to surround the intake duct 6. In the embodiment shown in FIG. 1, engine coolant is introduced into the cooling device 11 and cools intake air. The exhaust manifold 5 is connected to the inlet of the exhaust turbine 7b of the exhaust turbocharger 7, and the outlet of the exhaust turbine 7b is connected to an exhaust aftertreatment device 20.

The exhaust manifold 5 and the intake manifold 4 are connected to each other via an exhaust gas recirculation (hereinafter referred to as "EGR") passage 12, and an electronic EGR control valve 13 is provided in the EGR passage 12. A cooling device 14 for cooling EGR gas flowing through the EGR passage 12 is provided so as to surround the EGR passage 12. In the embodiment shown in FIG. 1, the engine coolant is introduced into the cooling device 14 and cools EGR gas. Each of the fuel injection valves 3 is connected to a common rail 16 via a corresponding fuel supply pipe 15. Fuel is supplied from a fuel pump 17 to the common rail 16. The fuel pump 17 is electronically controlled, and the discharge amount of the fuel pump 17 is variable. So, fuel is supplied to the common rail 16 from fuel pump 17, and then to the fuel injection valves 3 via the fuel supply pipes 15.

The exhaust gas aftertreatment device 20 includes an exhaust passage 21, a first exhaust passage 22a, and a second exhaust passage 22b. The exhaust passage 21 is connected to the outlet of the exhaust turbine 7b, and is bifurcated into the first exhaust passage 22a and the second exhaust passage 22b. A first NOx storage-reduction catalyst 23a, a first particulate filter 24a, a first oxidization catalyst 25a, and a first exhaust control valve 26a which is driven by an actuator 27a are provided in the first exhaust passage 22a in this order from the upstream side. Likewise, a second NOx storage-reduction catalyst 23b, a second particulate filter 24b, a second oxidization catalyst 25b, and a second exhaust control valve 26b which is driven by an actuator 27b are provided in the second exhaust passage 22b in this order from the upstream side. The first exhaust passage 22a and the second exhaust passage 22b are merged into a common exhaust passage 27 downstream of the first exhaust control valve 26a and the second exhaust control valve 26b.

A temperature sensor 28a, a first differential pressure sensor 29a, a temperature sensor 30a, and an air-fuel ratio sensor 31a are provided in the first exhaust passage 22a. The temperature sensor 28a detects the temperature of the first NOx storage-reduction catalyst 23a, and the first differential pressure sensor 29a detects a differential pressure across the first particulate filter 24a. The temperature sensor 30a detects the temperature of exhaust gas discharged from the first oxidization catalyst 25a, and the air-fuel ratio sensor 31a detects the air-fuel ratio of that exhaust gas. Likewise, a temperature sensor 28b, a second differential pressure sensor 29b, a temperature sensor 30b, and an air-fuel ratio sensor 31b are provided in the second exhaust passage 22b. The temperature sensor 28b detects the temperature of the second NOx storage reduction catalyst 23b, and the second differential pressure sensor 29b detects a differential pressure across the second particulate filter 24b. The temperature sensor 30b detects the temperature of exhaust gas discharged from the second oxidization catalyst 25b, and the air-fuel ratio sensor 31b detects the air-fuel ratio of that exhaust gas.

As shown in FIG. 1, a fuel valve 32 is provided in the exhaust manifold 5, and fuel is supplied from the fuel valve 32 into the exhaust manifold 5. In the embodiment of the invention, the fuel is diesel oil.

An electronic control unit 40 is a digital computer device that includes a read-only memory (ROM) 42, a random access memory (RAM) 43, a microprocessor (CPU) 44, an input port 45, and an output port 46, all connected via a bidirectional bus 41. Signals output from the air flow meter 8, the temperature sensors 28a, 28b, 30a, 30b, the differential pressure sensors 29a, 29b, and the air-fuel ratio sensors 31a, 31b are input to the input port 45 via corresponding AD converters 47. A load sensor 50 is connected to an accelerator pedal 49 and outputs an output voltage in proportion to the depression amount of the accelerator pedal 49. The output voltage of the load sensor 50 is input to the input port 45 via the corresponding AD converter 47. A crank angle sensor 51 is connected to the input port 45 and outputs an output pulse, for example, every time a crankshaft rotates by 15°. The output port 46 is connected to the fuel injection valves 3, a device for driving the throttle valve 10, the EGR control valve 13, the fuel pump 17, the actuators 27a, 27b, and the fuel valve 32 via corresponding drive circuits 48.

Figure 2:
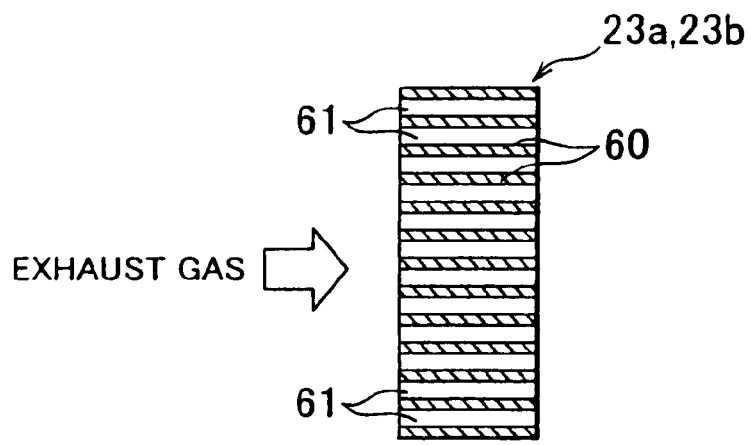
FIG. 2 is a side cross-sectional view of the NOx storage catalyst.
Figure 3A:
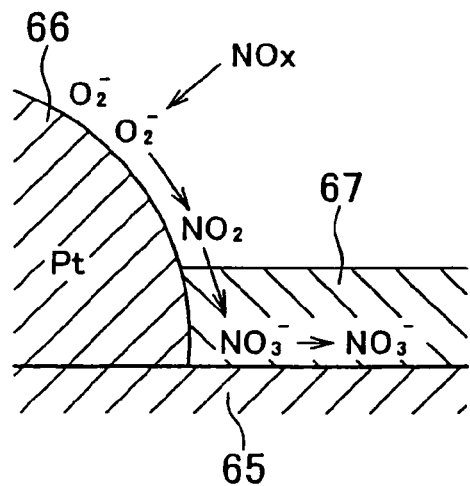
FIGS. 3A and 3B are cross-sectional views of the surface portion of the catalyst carrier.
Figure 3B:
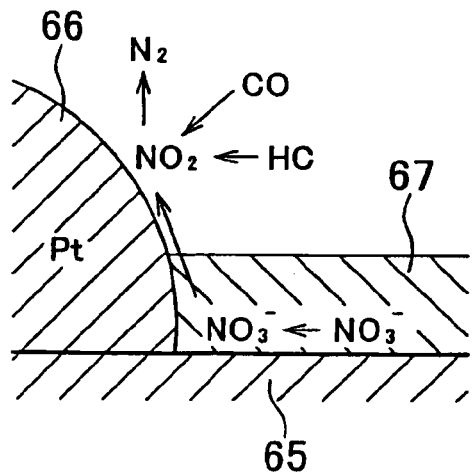

FIG. 2 shows the structure of the NOx storage reduction catalysts 23a, 23b. Referring to FIG. 2, the NOx storage reduction catalysts 23a, 23b each have a honeycomb structure and include a plurality of exhaust gas passages 61 which are separated from each other by thin partitions 60 provided in between the exhaust gas passages 61. Catalyst carriers 65 made of, for example, alumina, are supported on the surface of each side of each partition 60. FIGS. 3A and 3B show the cross-section of the surface portion of the catalytic carrier 65. As shown in FIGS. 3A and 3B, precious metal catalysts 66 are dispersedly supported on the surface of the catalytic carrier 65, and a layer of NOx absorbent 67 is formed on the surface of the catalytic carrier 65.

In the embodiment according to the invention, platinum Pt is used as the precious metal catalyst 66. The NOx absorbent 67 is constituted by, for example, at least one of alkaline metal such as potassium K, sodium Na, and cesium Cs; alkaline earth such as barium Ba and calcium Ca; and rare earth such as lanthanum La and yttrium Y. Provided that the ratio between air and fuel (hydrocarbon) which are supplied to the intake passages, the combustion chambers 2, and the exhaust passages upstream of the NOx storage reduction catalysts 23a, 23b is considered as the air-fuel ratio of exhaust gas, the NOx absorbent 67 absorbs NOx when the air-fuel ratio of exhaust gas is lean and releases the absorbed NOx when the oxygen concentration in exhaust gas low.

Hereinafter, detailed description will be made of how NOx is absorbed by and released from the NOx absorbent, with reference to an example where barium Ba is used as the component constituting the NOx absorbent 67. When the air-fuel ratio of exhaust gas is lean, that is, when the oxygen concentration in exhaust gas is high, NO contained in the exhaust gas is oxidized on the platinum Pt 66 into $NO_2$, as shown in FIG. 3A. Then, the $NO_2$ is absorbed by the NOx absorbent 67, and then it is combined with barium oxide BaO and dispersed in the NOx absorbent 67 in the form of nitrate ion $NO_3-$. This is how NOx is absorbed by the NOx absorbent 67. As long as the oxygen concentration in exhaust gas is high, $NO_2$ is continuously produced on the surface of the platinum Pt66. Further, until the NOx-absorbing capacity of the NOx absorbent 67 is saturated, $NO_2$ is continuously absorbed by the NOx absorbent 67 and nitrate ion $NO_3^-$ is continuously produced.

On the other hand, when the air-fuel ratio of exhaust gas is rich or stoichiometric, reverse reactions ($NO_3^-$ to $NO_2$) occur due to a low oxygen concentration. That is, the nitrate ion $NO_3^-$ contained in the NOx absorbent 67 is released from the NOx absorbent 67 in the form of $NO_2$, as shown in FIG. 3B. The released NOx is then reduced by unburned HC, CO contained in exhaust gas.

As described above, when the air-fuel ratio of exhaust gas is lean, that is, when engine combustion is performed at a lean air-fuel ratio, NOx contained in exhaust gas is absorbed by the NOx absorbent 67. However, if engine combustion continues at a lean air-fuel ratio, the NOx-absorbing capacity of the NOx absorbent is saturated, and thereafter the NOx absorbent 67 becomes unable to absorb any more NOx. To cope with this, in the embodiment of the invention, before the NOx-absorbing capacity is saturated, fuel is supplied from the fuel valve 32 to make the air-fuel ratio of exhaust gas temporarily rich and thereby release NOx from the NOx absorbent 67.

Figure 4A:
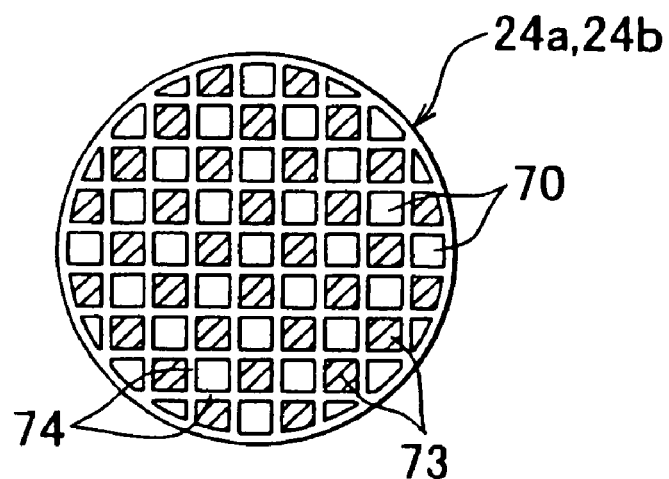
FIG. 4A is a front view of the particulate filter.
Figure 4B:
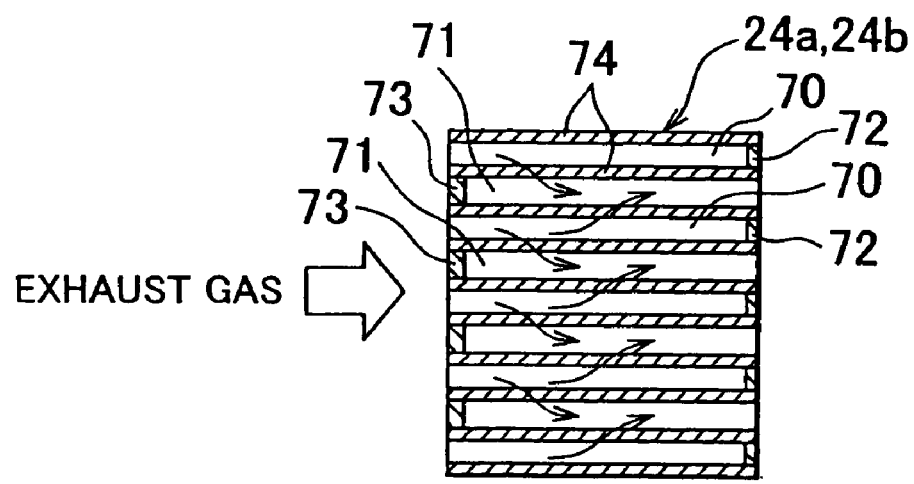
FIG. 4B is a side cross-sectional view of the particulate filter.

FIGS. 4A and 4B show the structure of the particulate filters 24a, 24b. FIG. 4A is a front view of the particulate filters 24a, 24b, and FIG. 4B is a side cross-sectional view of the particulate filters 24a, 24b. As shown in FIGS. 4A and 4B, the particulate filters 24a, 24b each have a honeycomb structure and include a plurality of exhaust passages 70, 71 that extend in parallel to each other. The downstream end of each of the exhaust gas inlet passages 70 is closed with a plug 72, and the upstream end of each of the exhaust gas outlet passages 71 is closed with a plug 73. It should be noted that the hatched portions in FIG. 4A indicate the plugs 73. The exhaust gas inlet passages 70 and the exhaust gas outlet passages 71 are alternately arranged across the partitions 74. In other words, the exhaust gas inlet passages 70 and the exhaust gas outlet passages 71 are arranged so that each exhaust gas inlet passage 70 is surrounded by four exhaust gas outlet passages 71 and each exhaust gas outlet passage 71 is surrounded by four exhaust gas inlet passages 70.

The particulate filters 24a, 24b are made of, for example, porous material such as cordierite. Thus, the exhaust gas which has flown into each of the exhaust gas inlet passages 70 passes through the surrounding partitions 74 and flows into the adjacent exhaust gas outlet passages 71, as indicated by the arrows in FIG. 4B. In the embodiment of the invention, the catalytic carriers 65, which are made of, for example, alumina, are supported on the peripheral wall surfaces of each of the exhaust gas inlet passages 70 and the exhaust gas outlet passages 71, that is, on the surfaces of both sides of each partition 74 and on the surfaces of internal walls of each pore in each partition 74. As shown in FIGS. 3A and 3B, the precious metal catalysts 66 made of platinum Pt are dispersedly supported on the surface of each catalytic carrier 65, and a layer of the NOx absorbent 67 is formed thereon.

As such, NOx contained in exhaust gas is absorbed by the NOx absorbent 67 on the particulate filters 24a, 24b when engine combustion is performed at a lean air-fuel ratio, and the NOx absorbed by the NOx absorbent 67 is released when fuel is supplied from the fuel valve 32.

The particulate matter contained in exhaust gas is captured on the particulate filters 24a, 24b and gradually oxidized. However, when more particular matter than can be oxidized starts to be captured, particular matter starts to be deposited on the particulate filters 24a, 24b, and as the deposited particulate matter increases, the engine output decreases. Therefore, the deposited particulate matter needs to be removed when its amount has increased to a certain level. In the case of the particulate filters 24a, 24b, the deposited particulate matter is oxidized and thus removed by heating the particulate filters 24a, 24b up to around 600° C.

In this embodiment of the invention, when the amount of particulate matter deposited on the particulate filters 24a, 24b exceeds an allowable limit, in other words, when a differential pressure ΔP across each of the particulate filters 24a, 24b detected by the differential pressure sensors 29a, 29b exceeds an allowable limit, fuel is supplied from the fuel valve 32 while the air-fuel ratio of exhaust gas flowing into each of the particulate filters 24a, 26b is kept lean. Then the temperature of each of the particulate filters 24a, 24b is increased due to the reaction heat that occur as the supplied fuel is oxidized, so that the particulate matter deposited on the particulate filters 24a, 24b are oxidized and thus removed therefrom.

It should be noted that, in FIG. 1, the NOx storage-reduction catalysts 23a, 23b may be omitted. Further, in FIG. 1, particulate filters that do not carry the NOx absorbent 67 may be used as the particulate filters 24a, 24b, provided that the NOx absorbent 67 is provided in both of the first exhaust passage 22a and the second exhaust passage 22b.

$SO_2$, as well as NOx, is contained in exhaust gas, and $SO_2$ is oxidized into $SO_3$ by the platinum Pt 66 shown in FIGS. 3A and 3B. Then, the $SO_3$ is absorbed by the NOx absorbent 67, after which it is combined with barium oxide BaO and dispersed in the NOx absorbent 67 in the form of nitrate ion $SO_4^{2-}$. This reaction produces stable sulfate salt $BaSO_4$. However, since the NOx absorbent 67 is strongly basic, such stable sulfate salt $BaSO_4$ can not be decomposed sufficiently. Therefore, when the air-fuel ratio is simply made rich, the sulfate salt $BaSO_4$ remains undecomposed. Accordingly, as time passes, sulfate salt $BaSO_4$ increases in the NOx absorbent 67. That is, the amount of NOx that can be absorbed by the NOx absorbent 67 decreases as time passes.

However, if the NOx absorbent 67 is heated to a SOx release temperature which is equal to or higher than 600° C., and the air-fuel ratio of exhaust gas is then made rich, SOx is released from the NOx absorbent 67. Thus, in this embodiment of the invention, when the amount of SOx absorbed by the NOx absorbent 67 has increased to a certain level, the air-fuel ratio is made rich after the temperature of the NOx absorbent 67 has been increased to the SOx release temperature.

Next, with reference to FIGS. 5A to 5D, the control for releasing NOx from the NOx absorbent 67 provided on each of the NOx storage-reduction catalysts 23a, 23b and from the NOx absorbent 67 provided on each of the particulate filters 24a, 24b will be described.

Figure 5A:
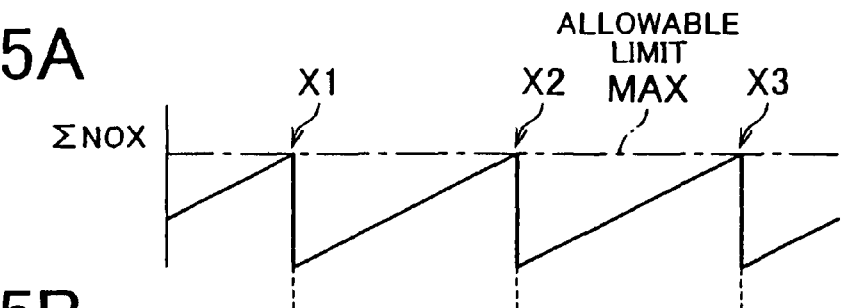
FIGS. 5A to 5D are time charts illustrating the amount of NOx absorbed in the NOx absorbent, the timing for supplying fuel, the timing for opening and closing the exhaust control valves, and the air-fuel ratio in the exhaust passages.
Figure 6:
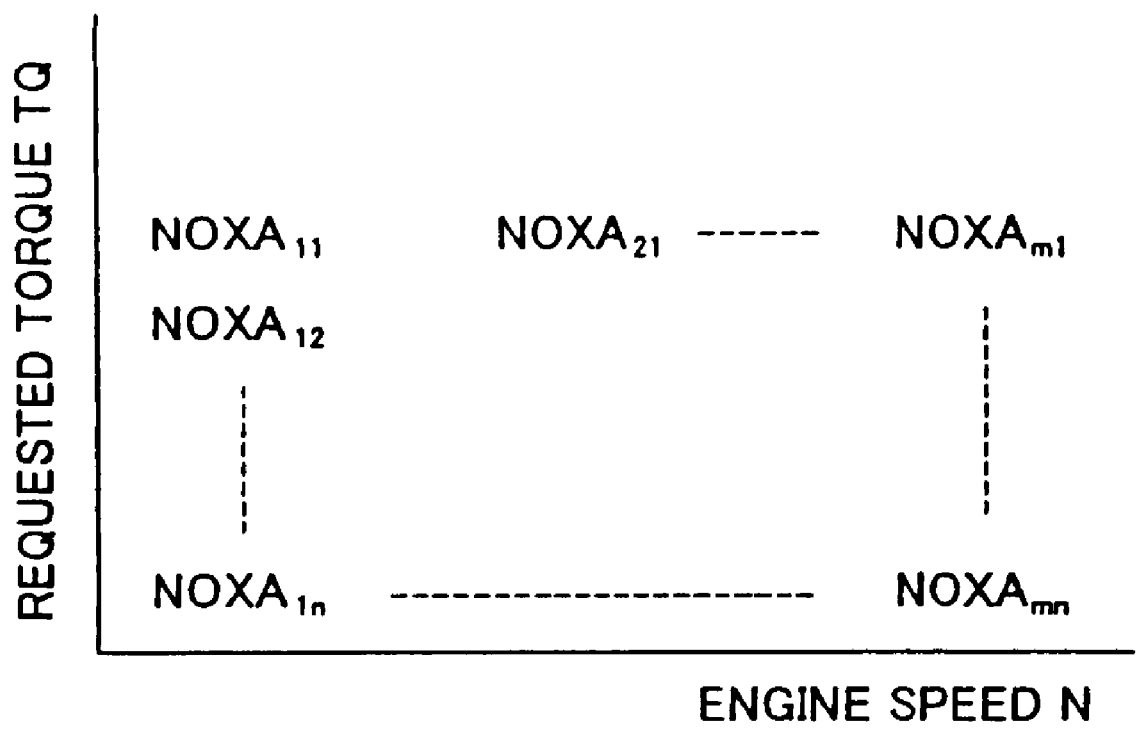
FIG. 6 is a view showing a map of the NOx amount NOXA.

The amount of NOx released from the engine per unit time varies in accordance with the operational state of the engine. Therefore, the amount of NOx absorbed by the NOx absorbent 67 per unit time also varies in accordance with the operational state of the engine. In this embodiment of the invention, a NOx amount NOXA that indicates the amount of NOx that is newly absorbed by the NOx absorbent 67 per unit time is stored in advance in the ROM 42 as a function of a requested torque TQ and an engine speed N in the form of a map as shown in FIG. 6. A NOx amount ΣNOX that indicates the amount of NOx presently absorbed in the NOx absorbent 67 is calculated by adding up the NOx amounts NOXA as shown in FIG. 5A.

Figure 5B:
Figure 5C:
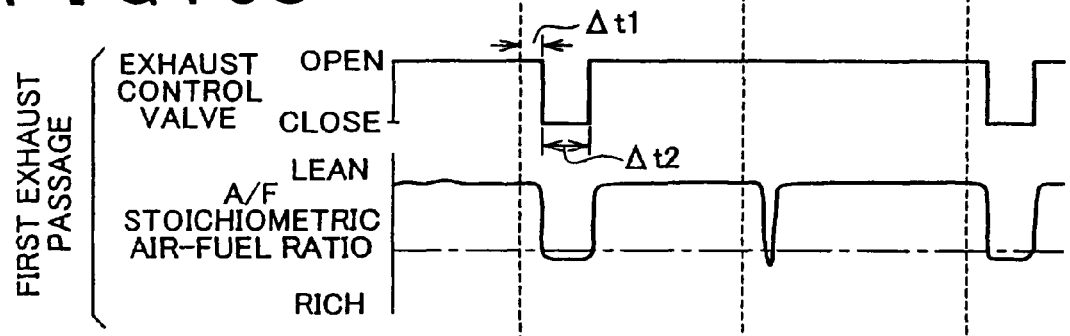
Figure 5D:
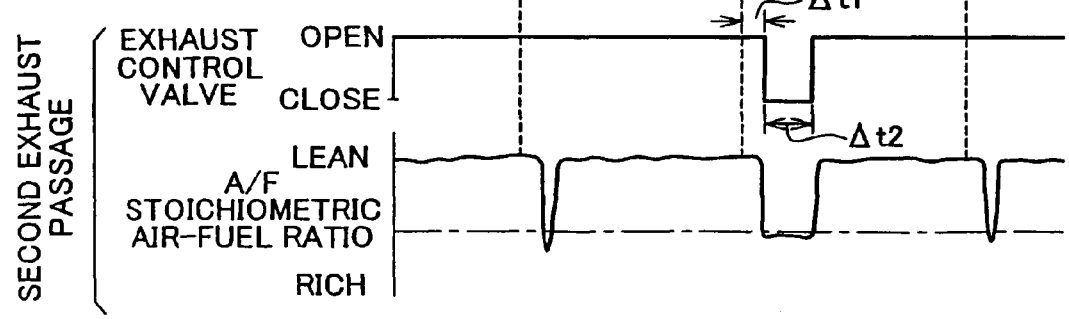

FIG. 5C shows how the first exhaust control valve 26a is closed and opened and how the air-fuel ratio in the first exhaust passage 22a changes, and FIG. 5D shows how the second exhaust control valve 26b is closed and opened and how the air-fuel ratio in the second exhaust passage 22b changes. As shown in FIGS. 5A to 5D, during a normal state, i.e. while the NOx amount ΣNOX is smaller than an allowable limit MAX, the first exhaust control valve 26a and the second exhaust control valve 26b are both open, and therefore exhaust gas having a lean air-fuel ratio is flowing through both the first exhaust passage 22a and the second exhaust passage 22b. During this time, therefore, the NOx absorbent 67 in each of the firsts exhaust passage 22a and the second exhaust passage 22b absorbs NOx in the exhaust gas.

When the NOx amount ΣNOX in the NOx absorbent 67 reaches or exceeds the allowable limit MAX (X1 in FIG. 5A), fuel is supplied from the fuel valve 32 to release NOx from the NOx absorbent 67. The fuel is supplied in the form of a mist, that is, in the form of micro particles. The fuel mist flows, together with exhaust gas, through the common exhaust passage 21 and then into each of the first exhaust passage 22a and the second exhaust passage 22b.

The fuel that has entered the first exhaust passage 22a and the second exhaust passage 22b does not immediately run through the first exhaust passage 22a and the second exhaust passage 22b, but moves therein more slowly than the exhaust gas does. During this, the fuel temporarily attaches to the NOx storage reduction catalyst 23a, the particulate filter 24a, and the oxidization catalyst 25a provided in the first exhaust passage 22a, and to the NOx storage reduction catalyst 23b, the particulate filter 24b, and the oxidization catalyst 25b provided in the second exhaust passage 22b, after which the fuel evaporates. As a result, as shown in FIGS. 5C and 5D, the air-fuel ratio of exhaust gas in the first exhaust passage 22a and the second exhaust passage 22b becomes rich, and NOx is released from the NOx absorbent 67 in each of the first exhaust passage 22a and the second exhaust passage 22b.

In this embodiment, the first exhaust control valve 26a is closed in response to a first period Δt1 having passed since the fuel was supplied from the fuel valve 32 (X1 in FIG. 5), while the second exhaust control valve 26b is kept fully open. Since the first exhaust control valve 26a is thus closed after the supply of fuel, the fuel that has entered the first exhaust passage 22a remains therein.

In this case, if the first exhaust control valve 26a is closed too early after the supply of fuel from the fuel valve 32, the fuel cannot move forward enough in the first exhaust passage 22a, and therefore the fuel cannot attach to the surfaces of the NOx storage reduction catalyst 23a and the particulate filter 24a sufficiently, and as a result the fuel does not remain in the first exhaust passage 22a. On the other hand, if the first exhaust control valve 26a is closed too late after the supply of fuel, the evaporated fuel flows out from the first exhaust passage 22a. That is, the first period Δt1 is the time period which enables the fuel supplied from the fuel valve 32 to remain in the first exhaust passage 22a.

Figure 7A:
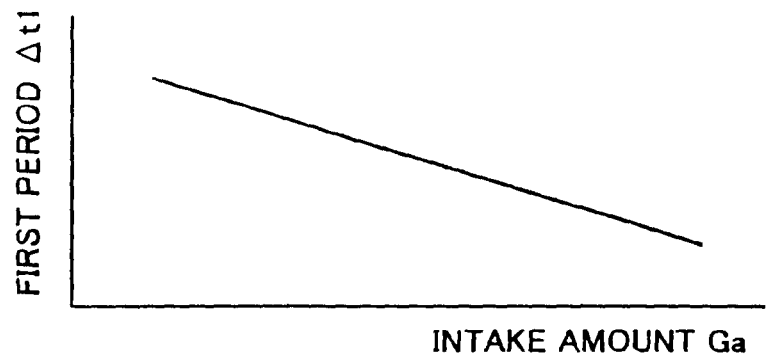
FIG. 7A is a graph showing the relationship between the first period $\Delta t1$ and the intake amount Ga.
Figure 7B:
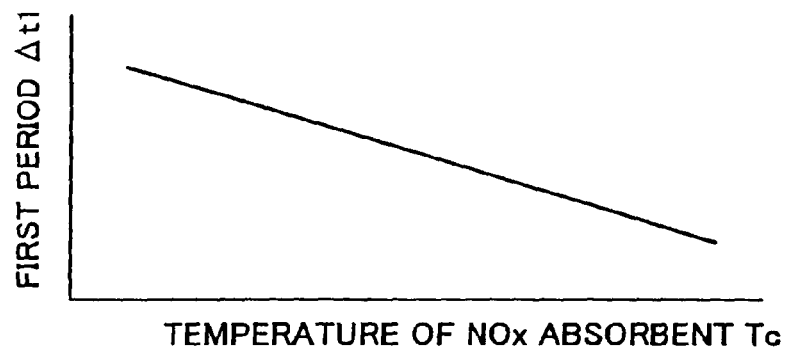
FIG. 7B is a graph showing the relationship between the first period $\Delta t1$ and the temperature Tc of the NOx absorbent.
Figure 7C:
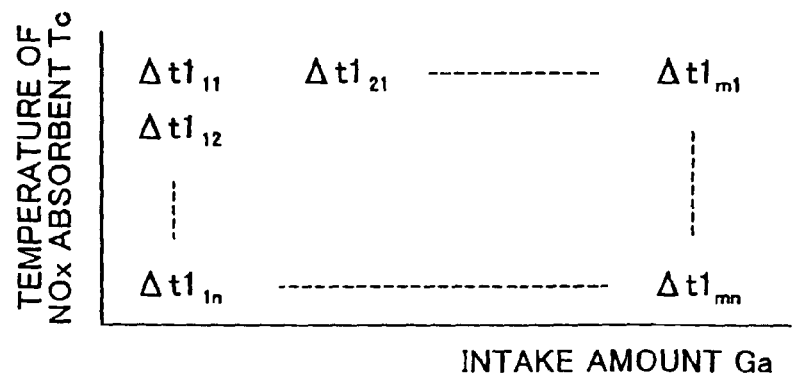
FIG. 7C is a graph showing a map of the first period $\Delta t1$.

Note that the higher the flow rate of exhaust gas, i.e., the larger the amount of intake air, the fuel moves further forward. Therefore, the first exhaust control valve 26b has to be closed earlier as intake air increases. Therefore, as shown in FIG. 7A, the first period Δt1 is reduced as an intake amount Ga increases. Further, an increase in the temperature of the NOx storage-reduction catalyst 23a and the particulate filter 24a, i.e. a temperature Tc of the NOx absorbent 67, facilitates evaporation of the fuel attached thereon. Therefore, as shown in FIG. 7B, the first period Δt1 is reduced as the temperature Tc of the NOx absorbent 67 increases. The first period Δt1 is stored in advance in the ROM 42 as a function of the intake amount Ga and the temperature Tc in the form of a map as shown in FIG. 7C.

The first control valve 26a is opened, that is, the first exhaust passage 22a is opened in response to a second period Δt2 having passed since the first control valve 26a was closed, that is, the first exhaust passage was closed. While the first exhaust control valve 26a is closed, the fuel attached to the NOx storage reduction catalyst 23a and the particulate filter 24a evaporates, and this makes the air-fuel ratio of exhaust gas remaining in the first exhaust passage 22a rich, whereby NOx absorbed in the NOx absorbent 67 is released and reduced. As such, the second period Δt2 is the time period during which the air-fuel ratio of exhaust gas in the first exhaust passage 22a is kept rich. The longer this time period, the more effectively NOx can be released and reduced.

Figure 8A:
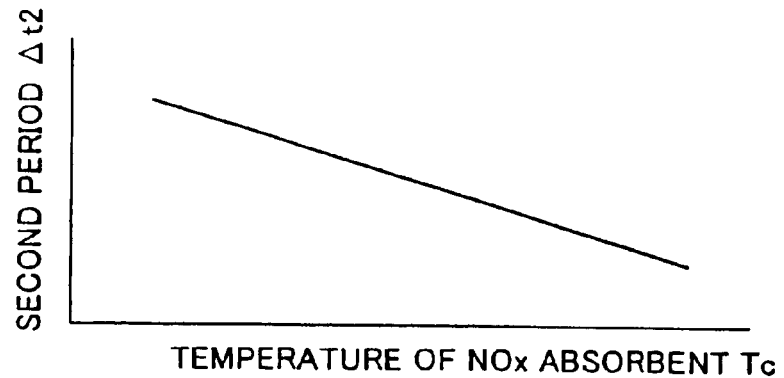
FIG. 8A is a graph showing the relationship between the second period $\Delta t2$ and the temperature Tc of the NOx absorbent.
Figure 8B:
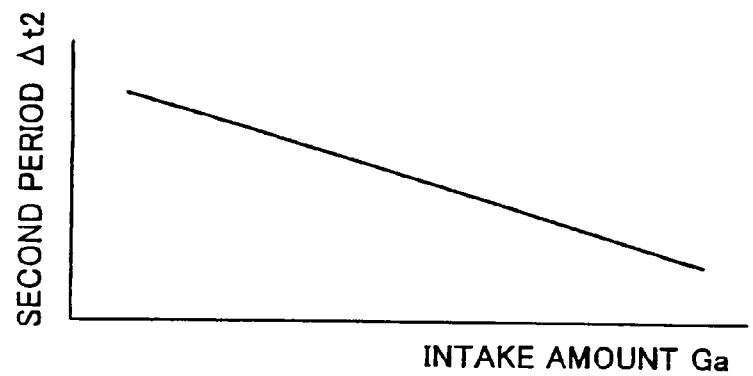
FIG. 8B is a graph showing the relationship between the second period $\Delta t2$ and the intake amount Ga.
Figure 8C:
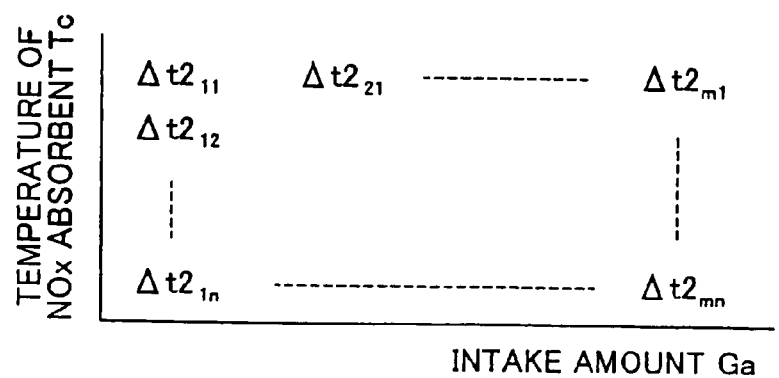
FIG. 8C is a graph showing a map of the second period $\Delta t2$.

Note that the higher the temperature Tc of the NOx absorbent 67, the faster NOx is released and reduced. Therefore, as shown in FIG. 8A, the second period Δt2 is reduced as the temperature Tc of the NOx absorbent 67 increases. Note that the exhaust control valves 26a, 26b allow a small amount of exhaust gas to flow therethrough even when they are fully closed. Therefore, even when the first exhaust control valve 26a is fully closed, exhaust gas having a lean air-fuel ratio flows into the first exhaust passage 22a. At this time, the larger the exhaust gas amount (the intake amount), the sooner the air-fuel ratio of exhaust gas in the first exhaust passage 22a changes from rich to lean. To cope with this, the second period Δt2 is reduced as the intake amount Ga increases, as shown in FIG. 8B. The second period Δt2 is stored in advance in the ROM 42 as a function of the intake amount Ga and the temperature Tc in the form of a map as shown in FIG. 8C.

After fuel has been supplied from the fuel valve 32 at X1 in FIG. 5A, the air-fuel ratio of exhaust gas in the second exhaust passage 22b becomes rich as described above, so that NOx is released from the NOx absorbent 67 in the second exhaust passage 22b. However, since the second exhaust control valve 26b is kept fully opened at this time, the fuel evaporated from the NOx storage reduction catalyst 23b and the particulate filter 24b does not remain in the second exhaust passage 22b. Accordingly, the air-fuel ratio of exhaust gas is kept rich longer in the first exhaust passage 22a than in the second exhaust passage 22b, as shown in FIGS. 5C and 5D. Thus, in this case, the releasing and reducing of NOx is less effectively performed in the second exhaust passage 22b than in the first exhaust passage 22a.

Subsequently, fuel is supplied from the fuel valve 32 at X2 in FIG. 5A, and the second exhaust control valve 26b is then closed in response to the first period Δt1 having passed since fuel was supplied. Afterwards, the second exhaust control valve 26b is opened in response to the second period Δt2 having passed since the second exhaust control valve 26b was closed. In this case, the air-fuel ratio of exhaust gas remains rich for a longer time in the second exhaust passage 22b than in the first exhaust passage 22a, as shown in FIGS. 5C and 5D.

Subsequently, fuel is supplied from the fuel valve 32 at X3 in FIG. 5A, and the first exhaust control valve 26a is temporarily closed. That is, the first exhaust passage 22a and the second exhaust passage 22b are alternately, and temporarily, closed each time the air-fuel ratio of exhaust gas is made rich so as to release NOx from the NOx absorbent 67.

In this way, in this embodiment describe above, when fuel is supplied to release NOx from the NOx absorbents 67 in each of the exhaust passages 22a, 22b, the fuel is made to flow into both of the exhaust passages 22a, 22b even though one of the exhaust control valves 26a, 26b is temporarily closed after the supply of fuel so as for the air-fuel ratio of the exhaust gas in the thus closed exhaust passage 22a or 22b to remain rich for a longer time. By thus introducing the fuel into both of the exhaust passages 22a, 22b, the fuel economy improves as compared to when fuel is introduced into either of the exhaust passages 22a, 22b.

More detail explanation will be made of this respect based on the following example. In this example, in order to release NOx from the NOx absorbents 67, fuel is supplied from the fuel valve 32 while the first exhaust control valve 26a is fully opened and the second exhaust control valve 26b is closed, so that the supplied fuel can be introduced into the first exhaust passage 22a only, and when the supplied fuel has entered the first exhaust passage 22a, the first exhaust control valve 26a is closed and the second exhaust control valve 26b is opened. In this case, theoretically, the supplied fuel can be all introduced into the first exhaust passage 22a, and after the first exhaust control valve 26a is closed, the air-fuel ratio of exhaust gas therein can be kept rich.

However, in reality, when the fuel is supplied while the first exhaust control valve 26a is fully opened and the second exhaust control valve 26b is closed in order for the supplied fuel to be all introduced into the first exhaust passage 22a, since the supplied fuel is in the form of micro particles at this time, a part of the supplied fuel flows into the second exhaust passage 22b due to inertia. Then, the introduced fuel attaches to the inner wall surfaces of the second exhaust passage 22b, and the like, and the attached fuel starts flowing through the second exhaust passage 22b when the second exhaust control valve 22b is fully opened later.

In this case, however, the attached fuel does not make the air-fuel ratio of exhaust gas in the second exhaust passage 22b rich, which means that NOx is not released from the NOx absorbent 67 in the second exhaust passage 22b. Namely, the attached fuel is just wasted. On the other hand, in the embodiment of the invention, the fuel introduced into each of the first exhaust passage 22a and the second exhaust passage 22b is effectively utilized to release NOx, leading to a better fuel economy.

With reference to FIGS. 9A to 9E, a control for rising the temperature of the particulate filters 24a, 24b, a control for burning particulate matter, and a control for releasing SOx from the NOx absorbent 67 will next be described. Referring to FIG. 9B, fuel is supplied from the fuel valve 32 to release NOx from the NOx absorbent 67 before the temperature rise control of the particulate filters 24a, 24b is performed in a period I shown in FIG. 9B, that is, fuel is so supplied during a normal state.

Figure 10A:
FIGS. 10A to 10C are time charts illustrating the timing for supplying fuel when the temperature of the particulate filters increases, the timing for opening and closing the exhaust control valves, and the air-fuel ratio in the exhaust passages.
Figure 10B:
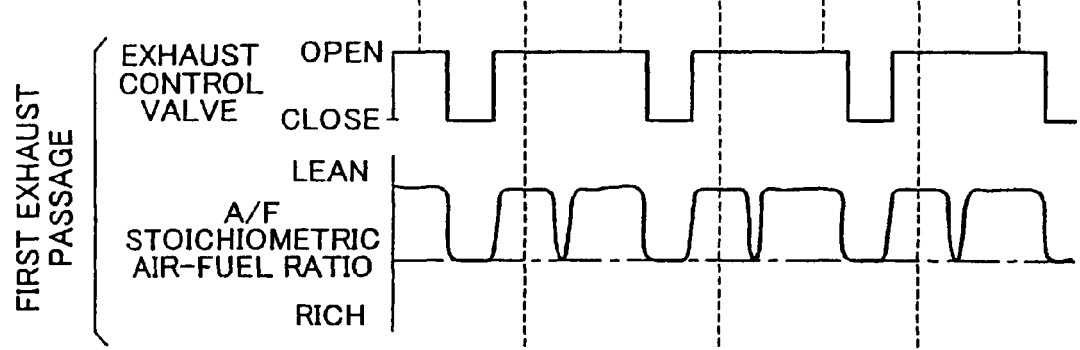
Figure 10C:
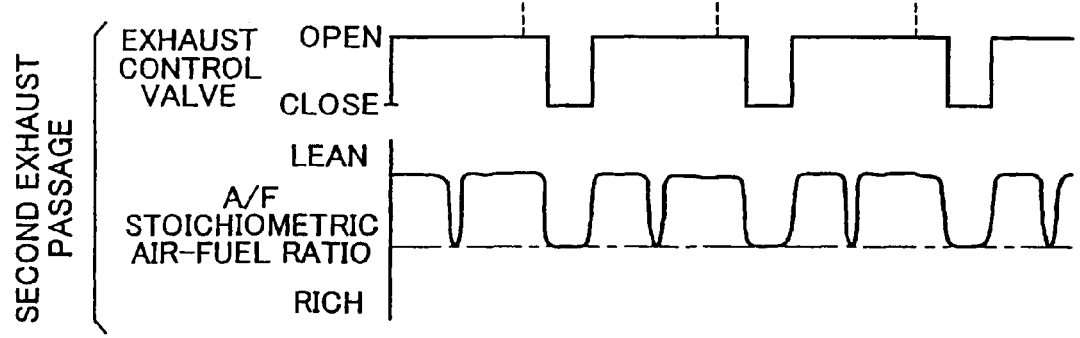

When the differential pressure ΔP detected by the differential pressure sensors 29a, 29b exceeds the allowable limit Po, the temperature rise control for the particulate filters 24a, 24b is performed in the period I. Similar to the NOx release control shown in FIGS. 5A to 5D, the temperature rise control is performed such that the first exhaust control valve 26a and the second exhaust control valve 26b are alternately, and temporarily, closed after fuel is supplied from the fuel valve 32 each time, as shown in FIGS. 10A to 10C. In this case, the amount of fuel to be supplied from the fuel valve 32 is adjusted such that the air-fuel ratio of exhaust gas in each exhaust passage becomes substantially stoichiometric. As such, the temperature of the particulate filters 24a, 24b increases as shown by "Tc" in FIG. 9D due to the reaction heat which occurs as of the supplied fuel is oxidized. In the temperature rise control described herein, since the exhaust control valve 26a, 26b are temporarily closed and the supplied fuel therefore remains in each exhaust passage, the oxidization of the fuel is promoted, which makes the fuel economy even better.

Figure 11A:
FIGS. 11A to 11C are time charts illustrating the timing for supplying fuel for burning particulate matter, the timing for opening and closing the exhaust control valves, and the air-fuel ratio in the exhaust passages.
Figure 11B:
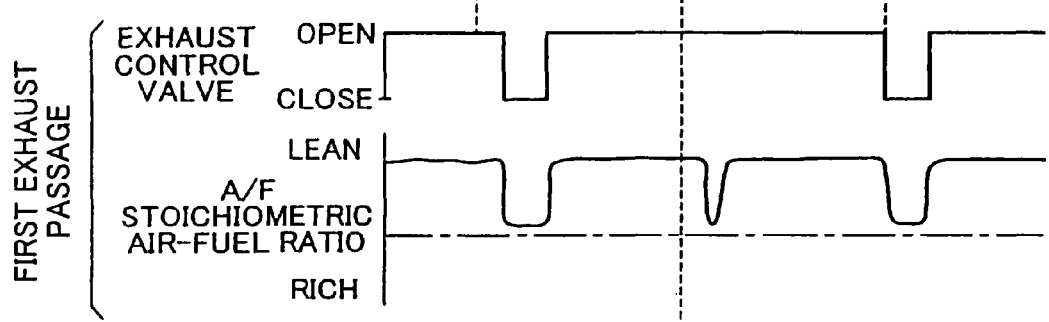
Figure 11C:
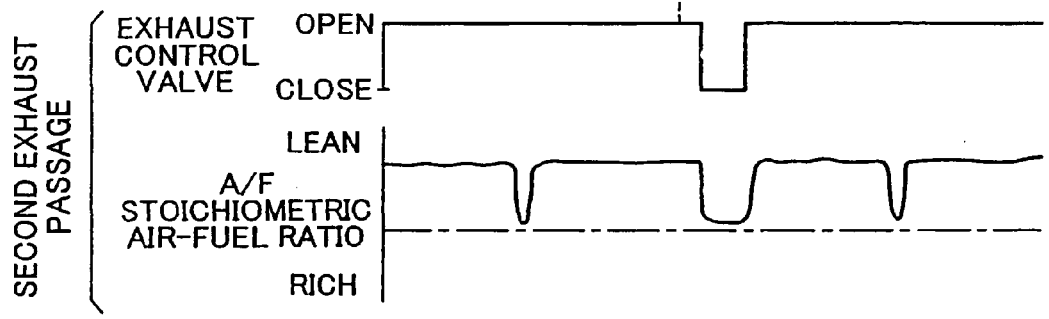

When the temperature rise control of the particulate filters 24a, 24b is completed, the burning control for burning particulate matter is performed at an lean air-fuel ratio in a period II, as shown in FIGS. 9A to 9E. Similar to the NOx release control shown in FIGS. 5A to 5D, this burning control is performed such that the first exhaust passage 26a and the second exhaust passage 26b are alternately, and temporarily, closed after fuel is supplied from the fuel valve 32 each time, as shown in FIGS. 11A to 11C. In this burning control, the amount of fuel to be supplied from the fuel valve 32 is adjusted to an amount necessary for maintaining the temperature of the particulate filters 24a, 24b at or above 600° C. Note that the exhaust control valves 26a, 26b may both be kept fully open during this burning control.

Figure 12A:
FIGS. 12A to 12C are time charts illustrating the timing for supplying fuel for releasing SOx, the timing for opening and closing the exhaust control valves, and the air-fuel ratio in the exhaust passages.
Figure 12B:
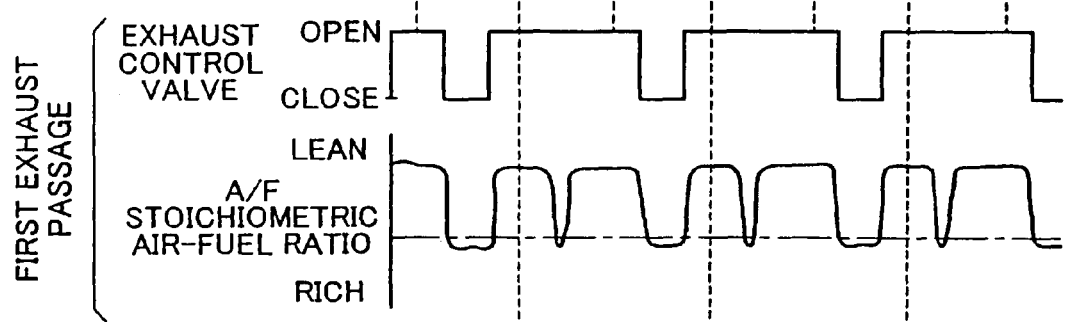
Figure 12C:
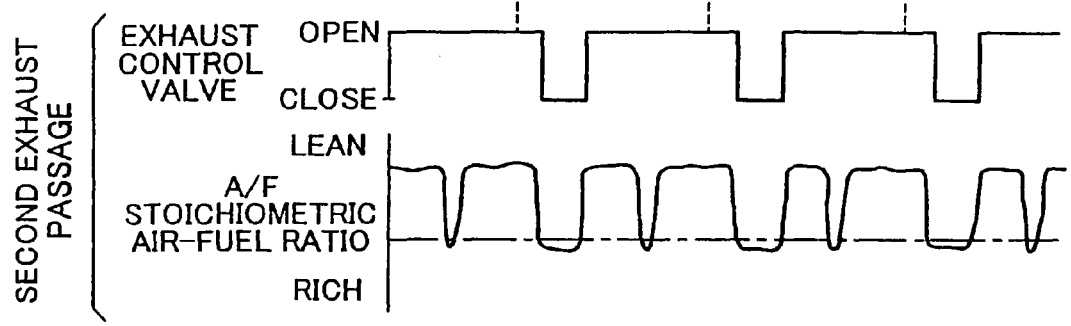

When the above burning control is completed, the SOx release control is then performed to release SOx from the NOx absorbent 67 in a period III, as shown in FIGS. 9A to 9E. Similar to the NOx release control shown in FIGS. 5A to 5D, the SOx release control is performed such that the first exhaust passage 26a and the second exhaust passage 26b are alternately, and temporarily, closed after fuel is supplied from the fuel valve 32 each time as shown in FIGS. 12A to 12C. In this SOx release control, the amount of fuel to be supplied from the fuel valve 32 is adjusted to an amount that makes the air-fuel ratio in each exhaust passage rich so that SOx is released from the NOx absorbent 67. Therefore, as the SOx release control proceeds, the amount of SOx absorbed in the NOx absorbent 67 gradually decreases as shown in FIG. 9E. In the SOx release control described herein, too, since the exhaust control valve 26a, 26b are temporarily closed and the supplied fuel therefore remains in each exhaust passage, the release of SOx is facilitated, which makes the fuel economy even better.

Figure 13A:
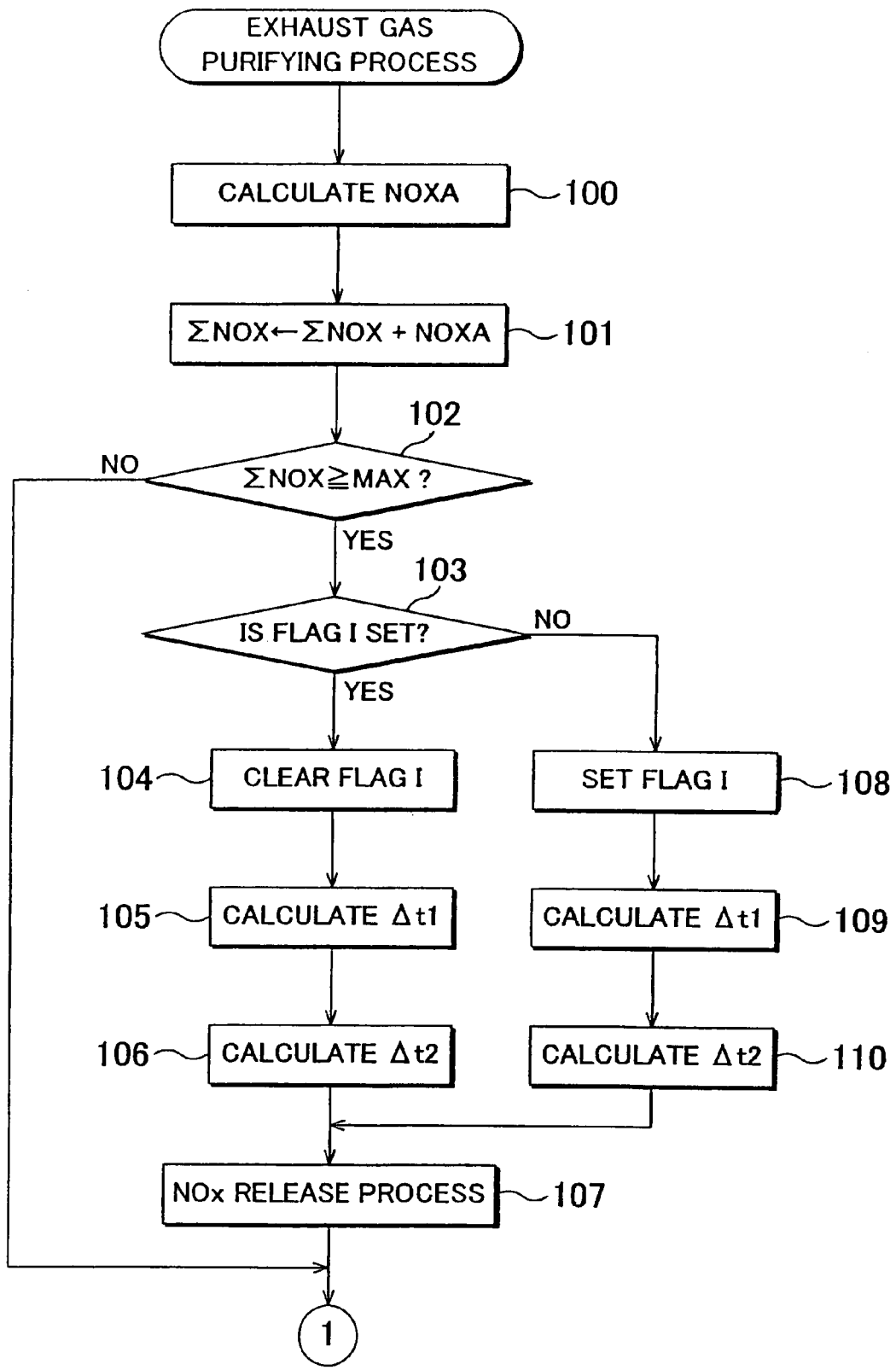

FIGS. 13A and 13B show an exhaust gas purifying routine. Referring to FIGS. 13A to 13B, when the routine starts, the NOx amount NOXA indicating the amount of NOx that is newly absorbed per unit time is first calculated based on the map shown in FIG. 6 in step 100. Then, in step 101, the NOx amount NOXA is added to the NOx amount ΣNOX indicating the amount of NOx that is presently absorbed in the NOx absorbent 67. Next, in step 102, it is determined whether the NOx amount ΣNOX is larger than, or equal to, the allowable limit MAX. If ΣNOX≧MAX is true, the process proceeds to step 103 and determines whether a flag I is set. The flag I indicates whether it is necessary to temporarily close the first exhaust control valve 26a. When it is determined in step 103 that the flag I is set, that is, when it is necessary to temporarily close the first exhaust control valve 26a, the process proceeds to step 104 and clears the flag I. Then, in step 105, the first period Δt1 is calculated from the map shown in FIG. 7C based on a representative temperature Tc of the NOx storage reduction catalyst 23a and the particulate filter 24a and the intake amount Ga. The representative temperature Tc is estimated based on either or both of the temperatures detected by the temperature sensors 28a, 30a, and the intake amount Ga is detected by the air flow meter 8. In step 106, the second period Δt2 is calculated from the map shown in FIG. 8C based on the representative temperature Tc of the NOx storage reduction catalyst 23a and the particulate filter 24a, and the intake amount Ga, after which the process proceeds to step 107.

In step 107, fuel, i.e. diesel oil is supplied from the fuel valve 32 as shown in FIGS. 5A,5B, and then the NOx amount ΣNOX is reset to 0. Afterwards, the first exhaust control valve 26a is closed when the first period Δt1 calculated in step 105 has passed, and then is opened when the second period Δt2 calculated in step 106 has passed.

On the other hand, in step 103, if it is determined that the flag I is not set, that is, when it is necessary to temporarily close the second exhaust control valve 26b, the process proceeds to step 108 and sets the flag I. Then in step 109, the first period Δt1 is calculated from the map shown in FIG. 7C based on a representative temperature Tc of the NOx storage reduction catalyst 23b and the particulate filter 24b, and an intake amount Ga. The representative temperature Tc is estimated based on either or both of the temperatures detected by the temperature sensors 28b, 30b, and the intake amount Ga is detected by the air flow meter 8. In step 110, the second period Δt2 is calculated from the map shown in FIG. 8C based on the representative temperature Tc of the NOx storage reduction catalyst 23b and the particulate filter 24b and the intake amount Ga, after which the process proceeds to step 107.

In step 107, as shown in FIGS. 5A and 5B, fuel, i.e. diesel oil is supplied from the fuel valve 32, and then the NOx amount ΣNOX is reset to 0. Afterwards, the first exhaust control valve 26b is closed when the first period Δt1 calculated in step 105 has passed, and then opened when the second period Δt2 calculated in step 106 has passed.

In step 111, it is determined whether the differential pressure ΔP detected by the differential sensors 29a, 29b has exceeded the allowable limit Po. That is, if the differential pressure ΔP is larger than the allowable limit Po, the process proceeds to step 112 to perform the temperature rise control for the particulate filters 24a, 24b in the period I, then to step 113 to perform the burning control of particulate matter in the period II, and to step 114 to perform the SOx release control in the period III, as shown in FIGS. 9A to 9E.

Figure 14A:
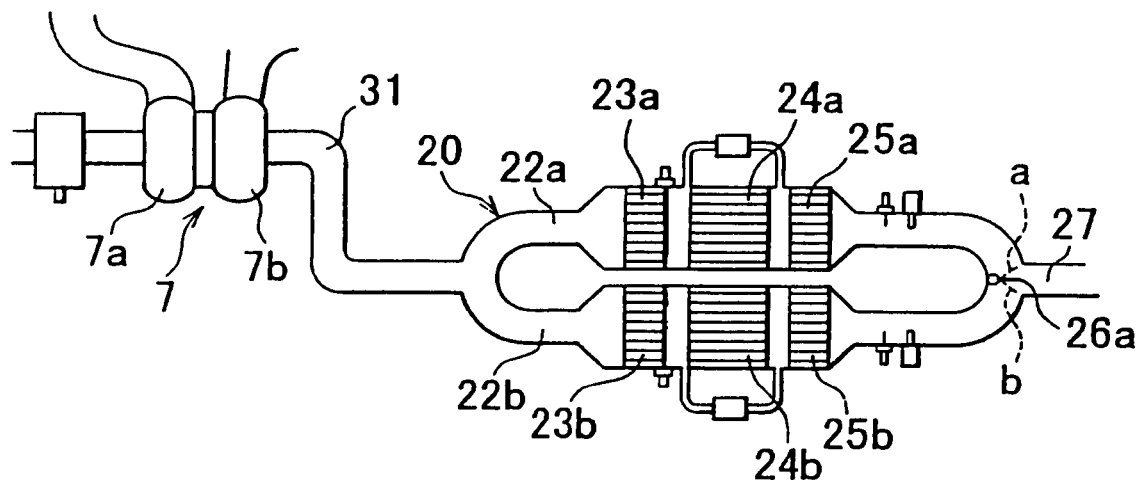
FIGS. 14A and 14B are graphs showing modification examples of the compression ignition type internal combustion engine.
Figure 14B:
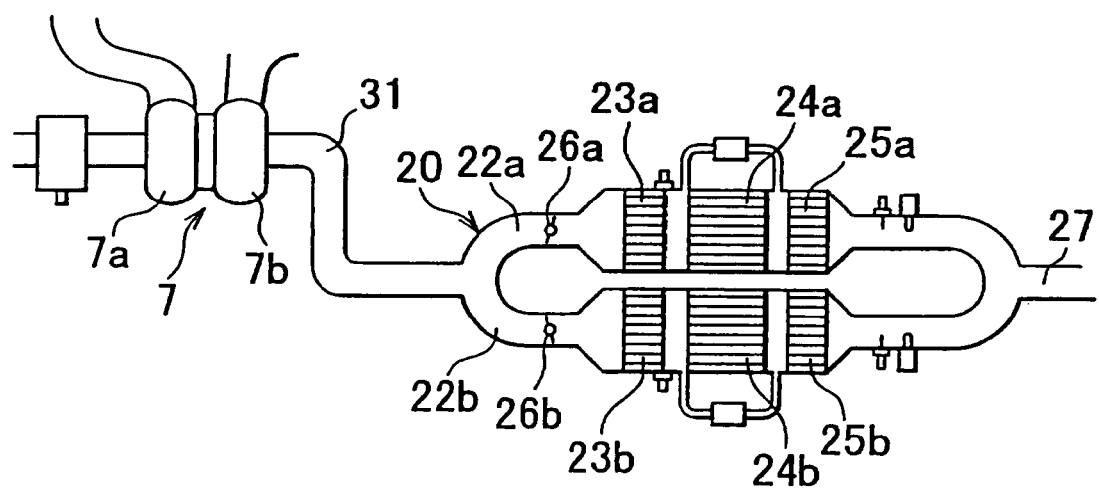

FIGS. 14A and 14B show, respectively, modification examples that are different from each other. In the example shown in FIG. 14A, one exhaust control valve 26 is provided at a portion where the downstream end of the first exhaust passage 22a and the downstream end of the second exhaust passage 22b are merged into the exhaust passage 27. This exhaust control valve 26 switches between the following three modes: the first mode where the first exhaust passage 22a and the second exhaust passage 22b are both opened as shown by the solid line in FIG. 14A; the second mode where only the first exhaust passage 22a is closed as shown by the dotted line a; and the third mode where only the second exhaust passage 22b is closed as shown by the dotted line b.

In the example shown in FIG. 14B, the first exhaust control valve 26a is provided in the first exhaust passage 22a upstream of the first NOx storage reduction catalyst 23a, and the second exhaust control valve 26b is provided in the second exhaust passage 22b upstream of the second NOx storage reduction catalyst 23b. If the first exhaust control valve 26a is closed at the timing when the supplied fuel attaches to the first NOx storage reduction catalyst 23a and the first particulate filter 24a, the air-fuel ratio of exhaust gas in the first exhaust passage 22a is kept rich. If the second exhaust control valve 26b is closed at the timing when the supplied fuel attaches to the second NOx storage reduction catalyst 23b and the second particulate filter 24b, the air-fuel ratio of exhaust gas in the second exhaust passage 22b is kept rich.

The invention claimed is:

1. An exhaust gas purifying apparatus for an internal combustion engine including a first exhaust passage and a second exhaust passage into which a common exhaust passage provided upstream of the first and second passages is bifurcated, wherein a NOx absorbent is provided in each of the first exhaust passage and the second exhaust passage, the NOx absorbent storing NOx contained in exhaust gas when an air-fuel ratio of incoming exhaust gas becomes lean and releasing the NOx when the air-fuel ratio of incoming exhaust gas becomes rich, wherein:

a fuel valve is provided in the common exhaust passage;

when it is necessary to release NOx from the NOx absorbent provided in the first exhaust passage and from the NOx absorbent provided in the second exhaust passage, fuel is supplied from the fuel valve so as to make the air-fuel ratio of exhaust gas in both of the first exhaust passage and the second exhaust passage rich; and one of the first exhaust passage and the second exhaust passage is closed during a period during which the air-fuel ratio of exhaust gas in the one of the first exhaust passage and the second exhaust passage remains rich, after the fuel is supplied from the fuel valve.

2. The exhaust gas purifying apparatus for an internal combustion engine according to claim 1, wherein the one of the first exhaust passage and the second exhaust passage, which is closed during the period during which the air-fuel ratio of exhaust gas in the one of the first exhaust passage and the second exhaust passage remains rich, after the supply of fuel from the fuel valve, alternates between the first exhaust passage and the second exhaust passage each time the air-fuel ratio of the exhaust gas is made rich to release NOx from the NOx absorbent.

3. The exhaust gas purifying apparatus for an internal combustion engine according to claim 1, wherein a NOx storage-reduction catalyst on which the NOx absorbent is supported is provided in each of the first exhaust passage and the second exhaust passage.

4. The exhaust gas purifying apparatus for an internal combustion engine according to claim 1, wherein a particulate filter on which the NOx absorbent is supported is provided in each of the first exhaust passage and the second exhaust passage.

5. The exhaust gas purifying apparatus for an internal combustion engine according to claim 1, wherein at least one exhaust control valve is provided so as to close the first exhaust passage and the second exhaust passage.

6. The exhaust gas purifying apparatus for an internal combustion engine according to claim 1, wherein after the fuel is supplied from the fuel valve, the one of the first exhaust passage and the second exhaust passage is closed a first time period after the supply of fuel from the fuel valve and is opened a second time period after the closure of the one of the first exhaust passage and the second exhaust passage.

7. The exhaust gas purifying apparatus for an internal combustion engine according to claim 6, wherein the first time period is a time period that enables the fuel supplied from the fuel valve to remain in the one of the first exhaust passage and the second exhaust passage.

8. The exhaust gas purifying apparatus for an internal combustion engine according to claim 7, wherein the first time period is reduced as an intake amount increases.

9. The exhaust gas purifying apparatus for an internal combustion engine according to claim 7, wherein the first time period is reduced as a temperature of the NOx absorbent increases.

10. The exhaust gas purifying apparatus for an internal combustion engine according to claim 6, wherein the second time period is a time period during which the air-fuel ratio of exhaust gas in the one of the first exhaust passage and the second exhaust passage is kept rich.

11. The exhaust gas purifying apparatus for an internal combustion engine according to claim 10, wherein the second time period is reduced as an intake amount increases.

12. The exhaust gas purifying apparatus for an internal combustion engine according to claim 10, wherein the second time period is reduced as a temperature of the NOx absorbent increases.

13. The exhaust gas purifying apparatus for an internal combustion engine according to claim 1, wherein a particulate filter is provided in each of the first exhaust passage and the second exhaust passage;
    fuel is supplied from the fuel valve when the particulate filters need to be heated and one of the first exhaust passage and the second exhaust passage is closed during the period during which the air-fuel ratio of exhaust gas in the one of the first exhaust passage and the second exhaust passage remains rich, after the fuel is supplied from the fuel valve.

14. The exhaust gas purifying apparatus for an internal combustion engine according to claim 1, wherein fuel is supplied from the fuel valve when it is necessary to release SOx from the NOx absorbent so as to make the air-fuel ratio of exhaust gas in each of the first exhaust passage and the second exhaust passage rich; and
    one of the first exhaust passage and the second exhaust passage is closed during the period during which the air-fuel ratio of exhaust gas in the one of the first exhaust passage and the second exhaust passage remains rich, after the fuel is supplied from the fuel valve.

15. A method for controlling an exhaust gas purifying apparatus for an internal combustion engine including a first exhaust passage and a second exhaust passage into which a common exhaust passage provided upstream of the first exhaust passage and the second exhaust passage is bifurcated, wherein a NOx absorbent is provided in each of the first exhaust passage and the second exhaust passage, the NOx absorbent storing NOx contained in exhaust gas when an air-fuel ratio of incoming exhaust gas is lean and releasing the NOx when the air-fuel ratio of incoming exhaust gas is rich, a fuel valve being provided in the common exhaust passage, comprising:
    supplying fuel from the fuel valve so as to make the air-fuel ratio of exhaust gas in both of the first exhaust passage and the second exhaust passage rich, when it is necessary to release NOx from the NOx absorbent provided in the first exhaust passage and the NOx absorbent provided in the second exhaust passage; and
    closing one of the first exhaust passage and the second exhaust passage during a period during which the air-fuel ratio of exhaust gas in the one of the first exhaust passage and the second exhaust passage remains rich, after the fuel is supplied from the fuel valve.

16. The control method for the exhaust gas purifying apparatus for an internal combustion engine according to claim 15, wherein the one of the first exhaust passage and the second exhaust passage, which is closed during the period during which the air-fuel ratio of exhaust gas in the one of the first exhaust passage and the second exhaust passage remains rich, after the supply of fuel from the fuel valve, alternates between the first exhaust passage and the second exhaust passage each time the air-fuel ratio of exhaust gas is made rich to release NOx from the NOx absorbent.

17. The control method for the exhaust gas purifying apparatus for an internal combustion engine according to claim 15, wherein after the fuel is supplied from the fuel valve, the one of the first exhaust passage and the second exhaust passage is closed a first time period after the supply of fuel from the fuel valve and then is opened a second time period after the closure of the one of the first exhaust passage and the second exhaust passage.

18. The control method for the exhaust gas purifying apparatus for an internal combustion engine according to claim 17, wherein the first time period is a time period that enables the fuel supplied from the fuel valve to remain in the one of the first exhaust passage and the second exhaust passage.

19. The control method for the exhaust gas purifying apparatus for an internal combustion engine according to claim 18, wherein the first time period is reduced as an intake amount increases.

20. The control method for the exhaust gas purifying apparatus for an internal combustion engine according to claim 18, wherein the first time period is reduced as a temperature of the NOx absorbent increases.

21. The control method for the exhaust gas purifying apparatus for an internal combustion engine according to claim 17, wherein the second time period is a time period during which the air-fuel ratio of exhaust gas in the one of the first exhaust passage and the second exhaust passage is kept rich.

22. The control method for the exhaust gas purifying apparatus for an internal combustion engine according to claim 21, wherein the second time period is reduced as an intake amount increases.

23. The control method for the exhaust gas purifying apparatus for an internal combustion engine according to claim 21, wherein the second time period is reduced as a temperature of the NOx absorbent increases.

24. The control method for the exhaust gas purifying apparatus for an internal combustion engine according to claim 15, wherein a particulate filter is provided in each of the first exhaust passage and the second exhaust passage;
    fuel is supplied from the fuel valve when the particulate filters need to be heated; and
    one of the first exhaust passage and the second exhaust passage is closed during the period during which the air-fuel ratio of exhaust gas in the one of the first exhaust passage and the second exhaust passage-remains rich, after the fuel is supplied from the fuel valve.

25. The control method for the exhaust gas purifying apparatus for an internal combustion engine according to claim 15, wherein fuel is supplied from the fuel valve when it is necessary to release SOx from the NOx absorbent, so as to make the air-fuel ratio of exhaust gas in each of the first exhaust passage and the second exhaust passage rich; and
    one of the first exhaust passage and the second exhaust passage is closed during a period during which the air-fuel ratio of exhaust gas in the one of the first exhaust passage and the second exhaust passage remains rich, after the fuel is supplied from the fuel valve.

* * * * *